United States Patent [19]
Yi Cho et al.

[11] 3,865,625
[45] Feb. 11, 1975

[54] MOLECULAR BEAM EPITAXY SHADOWING TECHNIQUE FOR FABRICATING DIELECTRIC OPTICAL WAVEGUIDES

[75] Inventors: Alfred Yi Cho, New Providence; Franz Karl Reinhart, Summit, both of N.J.

[73] Assignee: Bell Telephone Laboratories, Incorporated, Berkeley Heights, N.J.

[22] Filed: Oct. 13, 1972

[21] Appl. No.: 297,239

[52] U.S. Cl............. 117/212, 117/38, 117/93.3, 117/106 A, 117/215, 148/175, 350/96 WG
[51] Int. Cl..................... B44d 1/18, C23c 13/04
[58] Field of Search...... 117/106 A, 212, 215, 93.3, 117/38; 148/175; 350/96 WG

[56] References Cited
UNITED STATES PATENTS

| | | | |
|---|---|---|---|
| 2,938,816 | 5/1960 | Gunther | 117/212 |
| 2,994,621 | 8/1961 | Hugle et al. | 117/201 |
| 3,172,778 | 3/1965 | Gunther et al. | 148/175 X |
| 3,431,144 | 3/1969 | Yawata et al. | 117/215 X |
| 3,520,716 | 7/1970 | Okamoto et al. | 117/106 R |
| 3,615,931 | 10/1971 | Arthur | 148/175 |
| 3,751,310 | 8/1973 | Cho | 148/175 |

*Primary Examiner*—Leon D. Rosdol
*Assistant Examiner*—Harris A. Pitlick
*Attorney, Agent, or Firm*—M. J. Urbano

[57] ABSTRACT

An optical waveguide, comprising a dielectric core (e.g., GaAs) surrounded by a relatively lower refractive index cladding (e.g., AlGaAs), is fabricated by molecular beam epitaxy in which a plurality of sources (e.g., Al and GaAs) are arranged to produce at least two molecular beams which form an angle with one another and which overlap on a growth surface or substrate. An obstruction is placed near to the surface to shadow a selected one of the molecular beams (e.g., the Al beam) so that the molecules of that beam do not impinge upon a preselected region of the surface and so that molecules of the other beams (e.g., the GaAs beam) do impinge on the region. Consequently, an epitaxial layer is grown on the surface which has laterally contiguous zones of material having different refractive indices (e.g., a zone of GaAs coextensive with the preselected region and laterally contiguous zones of AlGaAs). The cladding is completed by growing lower refractive index layers (e.g., AlGaAs) both before and after the shadowing step.

19 Claims, 5 Drawing Figures

MOLECULAR BEAM EPITAXY SHADOWING TECHNIQUE FOR FABRICATING DIELECTRIC OPTICAL WAVEGUIDES

BACKGROUND OF THE INVENTION

This invention relates to dielectric optical waveguides and, more particularly, to a molecular beam epitaxy technique (MBE) for fabricating two-dimensional optical waveguides.

A dielectric optical waveguide generally comprises a dielectric core surrounded by a relatively lower refractive index cladding. As discussed by S. E. Miller in *The Bell System Technical Journal*, Vol. 48, pages 2,189–2,221, (1969), light propagating in the core is confined thereto by the refractive index discontinuity $\Delta n$ at the interface between the core and cladding. Illustratively, the core comprises a rectangular parallelepiped, and when bounded on all four sides by a cladding, the waveguide will hereinafter be termed two-dimensional.

The cross-sectional dimensions of the core (measured perpendicular to the direction of light propagation) as well as $\Delta n$ determine which of the discrete transverse modes of the propagating light will be supported by the waveguide. For lowest order or fundamental mode propagation, for example, the dimensions of the core are preferably on the order of the free space wavelength of the propagating light, e.g., 1 $\mu$m for a GaAs core. Fundamental mode propagation is typically preferred in high-power density systems and in optical communications systems to facilitate coupling between optical components (i.e., dispersion free propagation).

In addition, for low loss propagation, diffraction of light in the waveguide, especially at the core-cladding interface, should be kept to a minimum. To this end, the interface should be relatively free of defects. This result is readily achieved by fabricating the waveguide from mixed crystals which are lattice matched, preferably Group III($a$)-V($a$) compounds such as GaAs and AlGaAs or GaP and AlGaP. In mixed crystal systems, the interface has come to be known as a heterojunction.

Utilizing MBE it has been demonstrated not only that good quality heterojunctions can be fabricated from Group III($a$)-V($a$) compounds but also that good control of the thickness of the epitaxial layers can be maintained throughout the growth process. Yet, to this date no one has demonstrated how to make a two-dimensional waveguide with readily controllable dimensions--particularly the lateral dimensions measured parallel to the growth plane.

Summary of the Invention

In accordance with an illustrative embodiment of our invention, a dielectric optical waveguide is fabricated by MBE in which a plurality of sources (e.g., Al and GaAs) are arranged to produce at least two molecular beams which form an angle with one another and which overlap on a growth surface or substrate. An obstruction is placed near to the surface to shadow a selected one of the molecular beams (e.g., the Al beam) so that molecules of that beam do not impinge upon a preselected region of the surface and so that molecules of the other beams (e.g., the GaAs beam) do impinge on the region. Consequently, an epitaxial layer is grown on the surface which has laterally contiguous zones of material having different refractive indices (e.g., a zone of GaAs coextensive with the preselected region and laterally contiguous zones of AlGaAs). The cladding is completed by growing lower refractive index layers (e.g., AlGaAs) both before and after the shadowing step.

In a preferred embodiment, the obstacle is a thin mask, e.g., a thin wire or grid of wires, oriented parallel to the growth surface. The diameter of the wire and its position between the beam source and the growth surface are mutually adapted to produce full umbra shadowing in the preselected regions and penumbra shadowing in laterally adjacent regions. Illustratively, with an effusion cell diameter of 0.246 cm and a wire 50 $\mu$m in diameter placed 1 mm from the growth surface and 5 cm from the effusion cell, the full umbra region may be only 1 $\mu$m wide.

Consequently, it is possible to fabricate a GaAs core in the shape of a rectangular parallelepiped having controllable dimensions in cross section measuring about 1 $\mu$m × 1 $\mu$m. Such dimensions are suitable, but not essential, for fundamental mode propagation of light in a GaAs core which is surrounded by AlGaAs. Totally unexpected, however, was the fact that the shadowed molecules of Al, which strike the penumbra near the outer edges of the full umbra region (i.e., the GaAs core), do not have sufficient surface mobility to migrate into that region and thereby result in the growth of AlGaAs only, rather than a zone of GaAs and laterally adjacent zones of AlGaAs. This result is especially surprising when one considers that the Al molecules would have to migrate a distance equal to only one-half the full umbra width, e.g., about 0.5 $\mu$m, in order to produce AlGaAs in the core rather than GaAs.

BRIEF DESCRIPTION OF THE DRAWING

Our invention, together with its various features and advantages, will be readily understood from the following more detailed description, taken in conjunction with the accompanying drawing, in which.

DETAILED DESCRIPTION

Before discussing in detail specific embodiments of our invention, it will be helpful to first briefly review the basic MBE technique as taught in U.S. Pat. No. 3,615,931 granted on Oct. 26, 1971 to John R. Arthur, Jr. (Case 3) and assigned to the assignee hereof.

Apparatus

Figure 1:
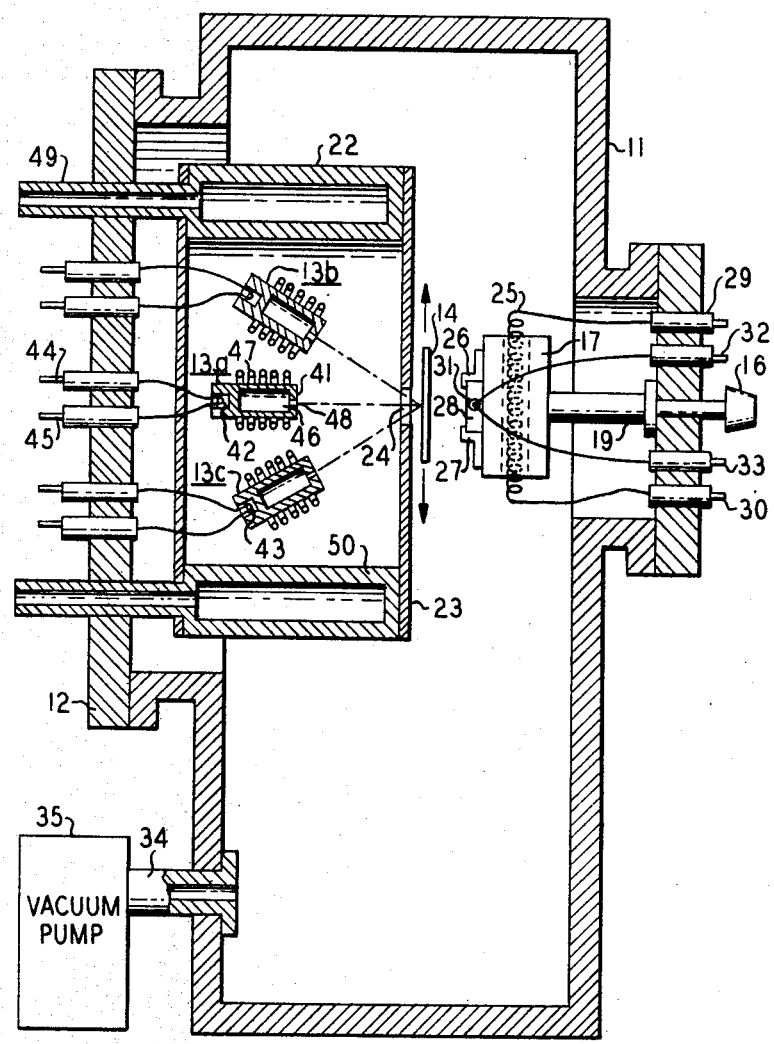
FIG. 1 is a partial schematic, partial cross-sectional view of apparatus for practicing our invention.

In FIG. 1 there is shown apparatus for growing by MBE epitaxial films of Group III($a$)-V($a$) compounds, and mixed crystals thereof, of controllable thickness on a substrate. The apparatus comprises a vacuum chamber 11 having disposed therein a gun port 12 containing illustratively three cylindrical guns 13$a$, 13$b$ and 13$c$, typically Knudsen cells, and a substrate holder 17, typically a molybdenum block. For clarity of illustration the guns are shown in a vertical plane although in practice they may be in a horizontal plane. Holder 17 is adapted for rotary motion by means of shaft 19 having a control knob 16 located exterior to chamber 11. Also shown disposed within chamber 11 is a cylindrical liquid nitrogen cooling shroud 22 hwich surrounds the guns and a collimating frame 23 having a collimating aperture 24. A movable shutter 14 is disposed in front of aperture 24. Substrate holder 17 is provided with an internal heater 25 and with clips 26 and 27 for affixing a substrate member 28 thereto. Additionally, a thermocouple is disposed in aperture 31 in the side of substrate 28 and is coupled externally via connectors 32-33 in order to sense the temperature of substrate 28. Chamber 11 also includes an outlet 34 for evacuating the chamber by means of a pump 35.

A typical cylindrical gun 13a comprises a refractory crucible 41 having a thermocouple well 42 and a thermocouple 43 inserted therein for the purpose of determining the temperature of the material contained therein. Thermocouple 43 is connected to an external detector (not shown) via connectors 44-45. Additionally, the crucible 41 has a source chamber 46 in which source material (e.g., bulk GaAs) is inserted for evaporation by heating coil 47 which surrounds the crucible. The end of crucible 41 adjacent aperture 24 is provided with a knife-edge opening 48 (typically about 0.17 cm$^2$) of diameter preferably less than the average mean free path of atoms in the source chamber.

General MBE Technique

The first step in a typical MBE fabrication technique involves selecting a single crystal substrate member, such as GaAs, which may readily be obtained from commercial sources. One major surface of the GaAs substrate member is initially cut along the (001) plane and polished with diamond paste, or any other conventional technique, for the purpose of removing the surface damage therefrom. An etchant such as a bromine-methanol or hydrogen peroxidesulphuric acid solution may be employed for the purpose of further purifying the substrate surface subsequent to polishing.

Next, the substrate is placed in an apparatus of the type shown in FIG. 1, and thereafter, the background pressure in the vacuum chamber is reduced to less than $10^{-6}$ torr and preferably to a value of the order of $10^{-9}$ to $10^{-10}$ torr, thereby precluding the introduction of any deleterious components onto the substrate surface. Since, however, the substrate surface may be subject to atmospheric contamination before being mounted into the vacuum chamber, the substrate is preferably heated, e.g., to about 600 degrees Centigrade, to provide an atomically clean growth surface, (i.e., desorption of contaminants such as CO and $H_2O$). The next steps in the process involve introducing liquid nitrogen into the cooling shroud via entrance port 49 and heating the substrate member to the growth temperature which typically ranges from about 450°-650° Centigrade dependent upon the specific material to be grown, such range being dictated by considerations relating to arrival rates and surface diffusion.

The guns 13a, 13b and 13c employed in the system have previously been filled with the requisite amounts of the constituents of the desired film to be grown. For example, gun 13b contains a Group III(a)-V(a) compound such as a GaAs in bulk form and gun 13a contains a Group III(a) element such as Al. The use of gun 13c is optional. Where it is desired to control the conductivity type of the epitaxial layers (as taught by A. Y. Cho in copending application Ser. No. 127,926 (Case 2) filed on Mar. 25, 1971, now U.S. Pat. No. 3,751,310, issued on Aug. 7, 1973 and assigned to the assignee hereof) then gun 13c may contain a dopant such as Ge, Si or Sn in bulk form. Alternatively, gun 13c may contain liquid Ga in order to control better the arrival rate of Ga atoms at the growth surface.

Each gun is heated to a temperature (not necessarily all the same) typically ranging from about 730 to 1000° Centigrade suffcient to vaporize the contents thereof to yield (with shutter 14 open) a molecular beam (or beams); that is, a stream of atoms manifesting velocity components in the same direction, in this case toward the substrate surface. The atoms or molecules reflected from the surface strike the interior surface 50 of the cooled shroud 22 and are condensed, thereby insuring that only atoms or molecules from the molecular beam impinge upon the surface.

For the purposes of the present invention, the amount of source materials (e.g., GaP or GaAs) furnished to the guns should be sufficient to provide an excess of $P_2$ or $As_2$ with respect to Ga. This condition arises from the large differences in sticking (i.e., condensation) coefficient at the growth temperature of the several materials; namely, unity for Ga and $10^{-2}$ for $As_2$ on GaAs surface, the latter increasing to unity when there is an excess of Ga on the surface. Therefore, as long as the $As_2$ arrival rate is higher that that of Ga, the growth will be stoichiometric. Similar considerations apply to Ga and P.

Growth of the desired epitaxial film is effected by directing the molecular beam generated by the guns at the collimating frame 23 which functions to remove velocity components therein in directions other than those desired, thereby permitting the desired beam to pass through the collimating aperture 24 to effect reaction at the substrate surface. Growth is continued for a time period sufficient to yield an epitaxial film of the desired thickness. This technique permits the controlled growth of films of thickness ranging from a single monolayer (about 3 A) to more than 20,000 A. Note, that the collimating frame serves also to keep the vacuum system clean by providing a cooled surface on which molecules reflected from the growth surface can condense. If the effusion cell provides sufficient collimation of the beams, however, the collimating frame is not essential to the growth technique.

The reasons which dictate the use of the aforementioned temperature ranges can be understood as follows. It is now known that Group III(a)-V(a) elements contained in compound semiconductors are adsorbed upon the surface of single crystal semiconductors at varying rates, the V(a) elements typically being almost entirely reflected therefrom in the absence of III(a) elements. However, the growth of stoichiometric III(a)-V(a) semiconductor compounds may be effected by providing vapors of Group III(a) and V(a) elements at the substrate surface, an excess of Group V(a) element being present with respect to the III(a) element, thereby assuring that the entirety of the III(a) element will be consumed while the nonreacted V(a) excess is reflected. In this connection, the aforementioned substrate temperature range is related to the arrival rate and surface mobility of atoms striking the surface, i.e., the surface temperature must be high enough (e.g., greater than 450° Centigrade) that impinging atoms have enough thermal energy to be able to migrate to favorable surface sites (potential wells) to form the epitaxial layer. The higher the arrival rate of these impinging atoms, the higher must be the substrate temperature. On the other hand, the substrate surface temperature should not be so high (e.g., greater than 650° Centigrade) that noncongruent evaporation results. As defined by C. D. Thurmond in *Journal of Physics Chem. Solids*, 26, 785 (1965), noncongruent evaporation is the preferential evaporation of the V($a$) element from the substrate leaving eventually only the III($a$) element. Generally, therefore congruent evaporation means that the evaporation rate of the III($a$) and V($a$) elements are equal. Similarly, the cell temperature must be high enough (> 730° Centigrade) to produce appreciable evaporation and yet not so high (< 1000° Centigrade) that the higher arrival rate of the V($a$) element will result in most of the V($a$) element being reflected from the surface before being trapped there by the III($a$) element.

Shadowing Technique

Figure 2:
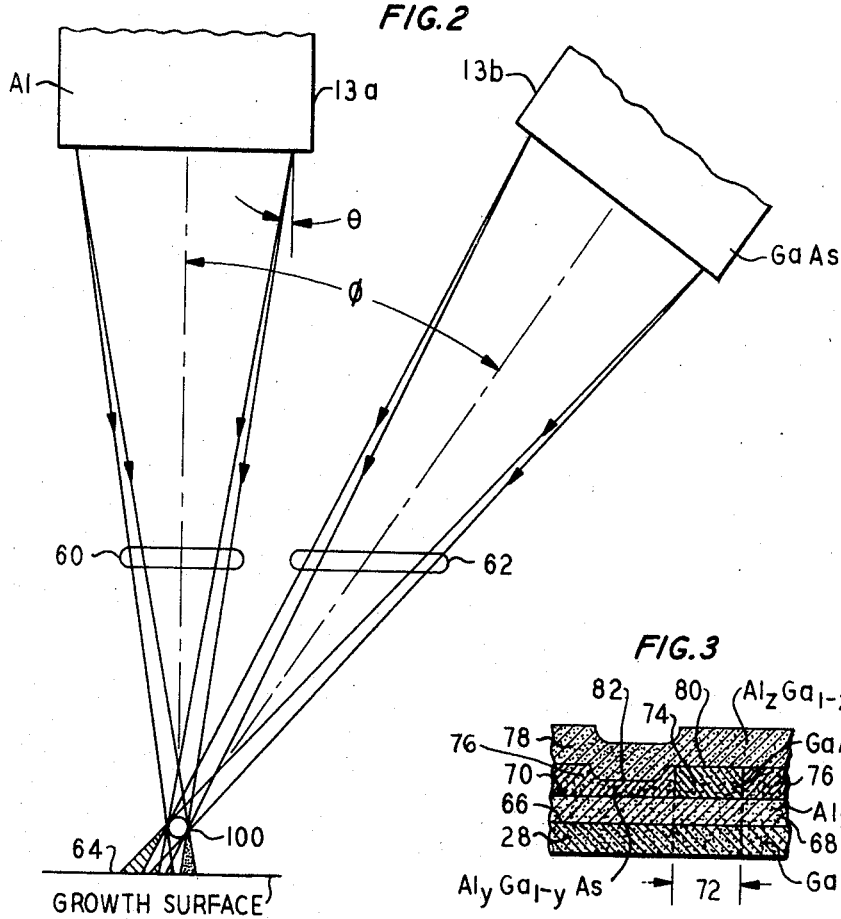
FIG. 2 shows, in accordance with an illustrative embodiment of our invention, how a shadowing obstacle is positioned between two source guns and a growth surface in apparatus of the type depicted in FIG. 1.

In accordance with an illustrative embodiment of our invention, a two-dimensional waveguide comprising a GaAs core surrounded by AlGaAs is fabricated utilizing the MBE technique and apparatus previously described with reference to FIG. 1 in combination with an obstruction placed near to the growth surface 64 as shown in FIG. 2. Illustratively, the obstruction comprises a wire 100 (or array of wires) parallel to surface 64.

As shown schematically in FIG. 2, gun 13$a$ contains Al whereas gun 13 contains GaAs, both in bulk form. The guns are heated to produce a beam 60 of Al molecules and a beam 62 of Ga and As$_2$ molecules. In addition, the guns are displaced from one another so that the beams (1) form an angle $\Phi$ with one another and (2) overlap on the growth surface 64. Of course, as successive layers are grown the actual growth surface changes, except that it is always the topmost major surface of the last grown layer.

Figure 3:
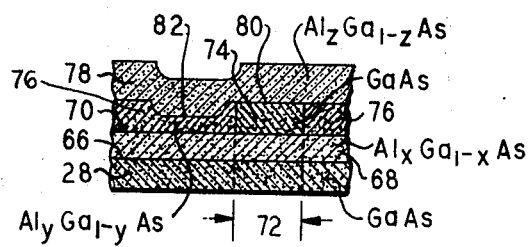
FIG. 3 is a cross-sectional view of a waveguide fabricated utilizing the arrangement of FIGS. 1 and 2.

Initially, the wire 100 is removed and, as shown in FIG. 3, an Al$_x$Ga$_{1-x}$As, layer 68, $0 < x < 1$, is grown on major surface 66 of GaAs substrate 28. Next, the wire 100 is placed near to surface 70 of layer 68 in order to prevent Al molecules from striking a preselected region 72 of layer 68 as shown in FIG. 3. Because of their relatively low surface mobility, the Al molecules do not migrate into region 72. As a consequence, a GaAs layer 74 (the waveguide core) is grown on region 72, whereas Al$_y$Ga$_{1-y}$As layers 76, $0 < y < 1$, are grown on the regions of growth surface 70 which are laterally contiguous with region 72. Finally, the wire 100 is again removed, and an Al$_z$Ga$_{1-z}$As layer 78, $0 < z < 1$, is grown over at least the top surface 80 of GaAs layer 74. The resultant structure is a two-dimensional waveguide comprising a GaAs core (layer 74) surrounded by an AlGaAs cladding (layers 68, 76 and 78).

Incidentally, it should be noted that the "dip" 82 in the surface profile of layer 76 results from partial shadowing of the GaAs beam 62 by wire 100. The dip, however, is of no serious consequence from a device standpoint as long as a sufficient number of Ga and As$_2$ molecules strike the zone thereunder to grow AlGaAs and not merely Al or some non-stoichiometric layer. The manner in which the latter result, as well as full umbra shadowing of the Al beam, is achieved will be next described.

Figure 4A:
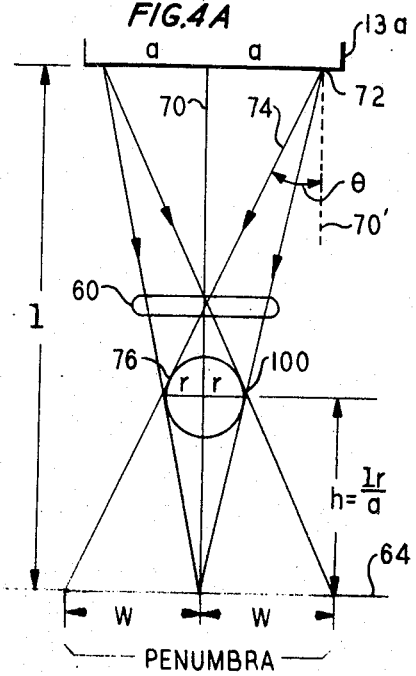
FIGS. 4A and 4B are geometric diagrams utilized to explain the preferred positioning of an obstacle-wire between a source gun and a growth surface.

Turning now to FIG. 4A, there is shown a cross-section of a wire 100 of diameter 2$r$ positioned between a growth surface 64 and a gun or effusion cell 13$a$ having an orifice of diameter 2$a$. The surface 64 and cell 13$a$ are a distance $l$ apart whereas the wire 100 is at a distance $h$ from surface 64. As in FIG. 2, lines 60 of FIG. 4A correspond to the direction of Al molecules in the beam taken from extreme points in the geometrical configuration, e.g., from the outermost edges of the cell orifice and tangent to wire 100. These extremes define what shadowing, if any, of the Al beam will occur. Therefore, for simplicity and clarity of explanation, lines representing molecules traveling in other directions (e.g., parallel to axis 70) have been omitted. A similar comment applies to the lines 62 which represent the directions of Ga and As$_2$ molecules emanating from cell 13$b$.

Returning our attention now to FIG. 4A specifically, it can be shown that when the wire 100 is placed at a distance $h$ from the surface 64 such that $$h \geq lr/a \tag{1}$$

then a penumbra shadow of width 2$w$ results where $$2w = l \tan\theta - a. \tag{2}$$

$\theta$, is the angle between the normal 70' to the surface 64 (or the cell orifice) and the beam path 74 taken from one edge 72 of the orifice to the farthest point tangent to the wire 100 (e.g., point 76). This angle is given by the expression $$\theta = \sin^{-1} [r/(a^2 + (l-h)^2)^{1/2}] + \sin^{-1} [a/(a^2 + (l-h)^2)^{1/2}], \tag{3}$$

assuming $r << l$. Under these circumstances, fewer Al molecules will strike surface 64 in the penumbra zone of width 2w than in the laterally contiguous zones. Therefore, the AlGaAs layer grown on the penumbra zone will have a higher refractive index, as desired in the core of a dielectric waveguide.

Figure 4B:
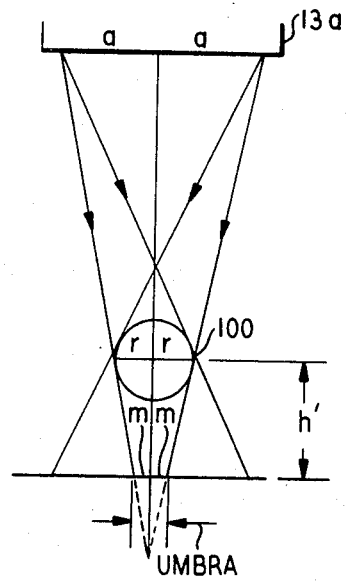

Where, however, it is desired that the core contain no Al (i.e., in a GaAs core), then it is necessary to produce on the growth surface an umbra zone in which no Al atoms strike. To effect this end, the wire is moved closer to the growth surface 64, as shown in FIG. 4B, so that the distance $h'$ therebetween satisfies the inequality $$h' < lr/a \tag{4}$$

Under these circumstances, Al molecules are shadowed completely from a region directly behind wire 100. This region, termed the umbra zone, has a width 2m given by $$2m = 2r (1 - ah/lr) \tag{5}$$

In the umbra zone, therefore, a layer of GaAs will grow whereas in the laterally contiguous penumbra zones AlGaAs will grow. To insure, however, that the GaAs beam strikes the penumbra zone on the side of wire 100 remote from the GaAs gun 13$b$ (FIG. 2), the GaAs gun should be oriented at an angle $\Phi$ from the Al gun such that $$\Phi > \theta \tag{6}$$

where $\theta$ is defined by equation (3). If $\Phi < \theta$, i.e., guns 13a and 13b overlap, then it is possible that only Al molecules, and no Ga or $As_2$, molecules will strike the aforementioned remote penumbra zone. Consequently, an AlGaAs layer would not grow there, resulting in an incomplete two-dimensional waveguide.

EXAMPLE

Utilizing the foregoing techniques, we have fabricated in accordance with an illustrative embodiment of our invention a two-dimensional dielectric waveguide of the type shown in FIG. 3.

In guns 13a and 13b were placed 1 gm. of Al and 3 gm. of GaAs both in bulk form. Guns 13a and 13b were arranged so that $\Phi \approx 20°$, approximately, but gun 13c was not utilized. The substrate 28, comprising n-type GaAs with its (001) surface facing the guns, was placed about 5 cm from the Al gun and was heated to about 560° Centigrade whereas the guns 13a and 13b were heated to 1,000° Centigrade and 980° Centigrade respectively. Before heating however, the vacuum in the chamber of FIG. 1 was reduced to about $10^{-8}$ torr. Under these conditions, an $Al_xGa_{1-x}As$ layer 68 ($x = 0.05$) about 1 $\mu$m thick was formed on the substrate in about 60 minutes.

Next, by means of a commercially available air-to-vacuum manipulator (not shown), a tungsten wire 100 $\mu$m in diameter was placed about 0.1 cm from the layer 68. Under these conditions, a GaAs core 74 about 2 $\mu$m thick and 20 $\mu$m wide was grown on the umbra zone of layer 68. The effusion cell diameter was 0.4 cm. Simultaneously, in the laterally contiguous penumbra zones $Al_yGa_{1-y}As$ layers 76 grown in about 120 minutes.

Finally, the wire was removed and a layer of $Al_zGa_{1-z}As$ 78 ($z = 0.05$) was grown over the top surface of structure. The resulting structure was a two-dimensional dielectric waveguide comprising a GaAs core (layer 74) surrounded on four sides by AlGaAs cladding (layers 68, 76 and 78).

It is to be understood that the above-described arrangements are merely illustrative of the many possible specific embodiments which can be devised to represent application of the principles of our invention. Numerous and varied other arrangements can be devised in accordance with these principles by those skilled in the art without departing from the spirit and scope of the invention. In particular, waveguides fabricated by our technique may be either passive (such as those used to make filters, couplers or interconnections) or may be active such as those used to make double heterostructure lasers or modulators). In the latter case, it is necessary to control the conductivity type of the layers grown. The teachings of the previously mentioned copending application of A. Y. Cho (Case 2, supra) are useful in this regard. With respect to the GaAs-AlGaAs system, that application teaches the use of Sn as an n-type impurity, Si as either n-type or compensating impurity and Ge as either n-type or p-type impurity depending on whether the underlying layer is Ga-stabilized or As-stabilized, respectively. In this regard, however, it should be readily appreciated by one skilled in the art that our invention is not limited in its application to the GaAs-AlGaAs system. Rather, other systems such as GaP-AlGaP are also suitable. In general, material systems which are lattice matched, whether ternary or quaternary, so that relatively defect free heterojunctions can be fabricated, are to be preferred in the fabrication of good quality dielectric waveguides.

What is claimed is:

1. A molecular beam epitaxy method of fabricating on a growth surface an epitaxial layer comprising a compound of the form $A_xB_{1-x}C$, $0 \leq x \leq 1$, where A is a first Group III(a) element, B is a second Group III(a) element and C is a Group V(a) element, said layer having a preselected zone and laterally contiguous zones which have different refractive indexes from, and each of which are substantially lattice matched to, said preselected zone, said method comprising the steps of:
    a. reducing the background pressure to a subatmospheric pressure;
    b. preheating the growth surface to a temperature in the range of about 450° to 650° Centigrade;
    c. directing at least two molecular beams at said surface so that said beams form an angle with one another and overlap on said surface, one of said beams comprising molecules of said first Group III(a) element and other beams comprising molecules of said second Group III(a) element and said Group V(a) element; and
    d. placing an obstruction in the path of said beams so that molecules in one of said beams are prevented from striking said preselected zone of said surface and so that molecules in another beam are permitted to strike said zone.

2. The method of claim 1 wherein said obstruction is positioned to produce in said preselected zone umbra shadowing of the molecules in said one beam.

3. The method of claim 1 wherein the solidus compositions of said compound are lattice matched with one another.

4. The method of claim 3 wherein said compound comprises $Al_xGa_{1-x}P$.

5. The method of claim 3 wherein said compound comprises $Al_xGa_{1-x}As$.

6. The method of claim 5 wherein bulk Al is heated in one gun member to produce Al molecules in said one beam and bulk GaAs is heated in another gun member to produce a beam of Ga and $As_2$ molecules.

7. The method of claim 5 wherein GaAs is grown on said preselected zone and $Al_xGa_{1-x}As$ is grown on zones laterally adjacent thereto.

8. The method of claim 1 wherein said pressure is about $10^{-8}$ torr.

9. A molecular beam epitaxy method of fabricating on a substrate surface a two dimensional optical dielectric waveguide from compounds of the form $A_xB_{1-x}C$, $0 \leq x \leq 1$, where A is a first Group III(a) element, B is a second Group III(a) element and C is a Group V(a) element, comprising the steps of:
    a. reducing the background pressure to a subatmospheric pressure;
    b. preheating the substrate to a temperature in the range of about 450° to 650° Centigrade;
    c. directing at least two molecular beams at said substrate surface so that said beams form an angle $\Phi$ with one another and overlap on said surface, one of said beams comprising molecules of said first Group III(a) element and other beams comprising molecules of said second Group III(a) element and said Group V(a) element, thereby growing a first epitaxial layer of the form $A_y B_{1-y} C, 0 < y < 1$, d. placing an obstruction in the path of said beams so that molecules in one of said beams are prevented from striking a preselected zone of said first layer and so that molecules in another beam are permitted to strike said zone, thereby fabricating a second epitaxial layer having contiguous zones of different refractive indices; and e. removing said obstruction and growing on said second layer a third epitaxial layer of the form $A_z B_{1-z} C, 0 < z < 1$, $z$ not necessarily equal to $y$.

10. The method of claim 9 wherein said pressure is about $10^{-8}$ torr.

11. The method of claim 9 wherein the solidus compositions of said compound are lattice matched with one another.

12. The method of claim 11 wherein said compound comprises $Al_x Ga_{1-x} P$.

13. The method of claim 11 wherein said compound comprises $Al_x Ga_{1-x} As$.

14. The method of claim 13 wherein GaAs is grown on said preselected zone and $Al_x Ga_{1-x} As$ is grown on zones laterally adjacent thereto.

15. The method of claim 9 wherein said molecular beams are formed by heating at least two gun members containing the constituent components of said beams to a temperature sufficient to vaporize said components.

16. The method of claim 15 wherein said obstruction is positioned to produce in said preselected zone umbra shadowing of molecules in said one beam.

17. The method of claim 16 wherein one gun member contains bulk Al and another contains bulk GaAs, and said obstruction is positioned to produce in said preselected zone umbra shadowing of Al molecules emanating from said one gun member.

18. The method of claim 16 wherein said obstruction comprises a cylindrical wire of diameter $2r$ oriented substantially parallel to said first layer and at a distance $h$ therefrom, so that $$h < lr/a$$

where $l$ is the distance between the first layer and the gun member from which said one beam emanates and $2a$ is the diameter of the orifice of said latter gun member, thereby to produce an umbra in said preselected zone.

19. The method of claim 18 wherein said angle $\Phi$ satisfies the inequality $$\Phi < \sin^{-1}[r/(a^2+(l-h)^2)^{1/2}] + \sin^{-1}[a/(a^2+ (l-h)^2)^{1/2}]$$

and $r << l$.

* * * * *